United States Patent [19]
Wycoff

[11] 3,823,375
[45] July 9, 1974

[54] SYSTEM FOR TRANSMITTING PRIORITY MESSAGES AND SECONDARY MESSAGES

[76] Inventor: Keith H. Wycoff, P.O. Box 308, Lexington, Nebr. 68850

[22] Filed: Nov. 8, 1971

[21] Appl. No.: 196,314

[52] U.S. Cl. .......... 325/57, 325/55, 325/64, 325/155, 325/168, 340/311

[51] Int. Cl. .......... H04b 1/00

[58] Field of Search .......... 325/21, 22, 54, 55, 57, 325/64, 133, 155, 168, 187; 340/311, 312

[56] References Cited

UNITED STATES PATENTS

| | | | |
|---|---|---|---|
| 3,581,013 | 5/1971 | Muller | 325/64 |
| 3,588,371 | 6/1971 | Monte | 325/64 |

*Primary Examiner*—Albert J. Mayer
*Attorney, Agent, or Firm*—David A. Vogel

[57] ABSTRACT

There are provided a first input for the priority message and a second input for the secondary message. A memory circuit coupled to the second input stores the secondary message. A sensing circuit is responsive to the concurrence of the absence of a priority message and the presence of a secondary message to provide a control signal. A readout circuit is responsive to the control signal to cause the memory circuit to release the stored secondary message. An output circuit accepts either the priority message if present, or the secondary message from the memory circuit.

25 Claims, 6 Drawing Figures

SYSTEM FOR TRANSMITTING PRIORITY MESSAGES AND SECONDARY MESSAGES

It is an important object of the present invention to provide a system which will transmit priority messages when present, and will transmit stored secondary messages between successive priority-message transmissions.

Another object is to provide a system for a transmitter which will optimize utilization of its associated transmitter channel.

Still another object is to provide a system which will transmit priority messages and transmit stored secondary meassages without the carrier wave going off the air.

Yet another object is to provide a system which will cause the transmitter to transmit stored secondary messages without requiring manual operation.

A further object of the invention is to maximize the number of message transmissions in a given channel per unit of time.

A still further object is to make use of radio transmitter time for normal two-way communications, and at the same time allow radio paging on the channel without interfering with normal two-wave voice communications, and in fact, without the base station transmitter operator being aware of the paging transmissions taking place.

In summary, there is provided a system for transmitting priority and secondary messages comprising first input means for the priority message, second input means for the secondary message, a memory circuit coupled to the second input means for storing a secondary message therefrom, circuit means coupled to the first input means and to the memory circuit and responsive to the concurrence of the absence of a priority message and the presence of a secondary message to provide a control signal, readout means having an output coupled to the memory circuit and an input coupled to the circuit means and being responsive to the control signal to cause the memory circuit to release the stored secondary message, and an output circuit coupled to the first input means and to the memory circuit respectively for utilizing the priority messages and the secondary messages therefrom.

In a preferred form, the system is used in a transmitter, and there is provided means responsive to the concurrence of the absence of the priority message and the presence of the secondary message to maintain the power supply energized despite the push-to-talk switch being open, closure of the switch being operative to cause transmission of the carrier wave and to enable modulation of the carrier wave with the priority message. The subsequent opening of the switch when a secondary message is stored in the memory circuit automatically continues transmission of a carrier wave and modulates it with one or more stored secondary messages.

With the foregoing and other objects in view, which will appear as the description proceeds, the invention consists of certain novel features and a combination of parts hereinafter fully described, illustrated in the accompanying drawings, and particularly pointed out in the appended claims, it being understood that various changes in the details of the circuitry may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

Figure 1:
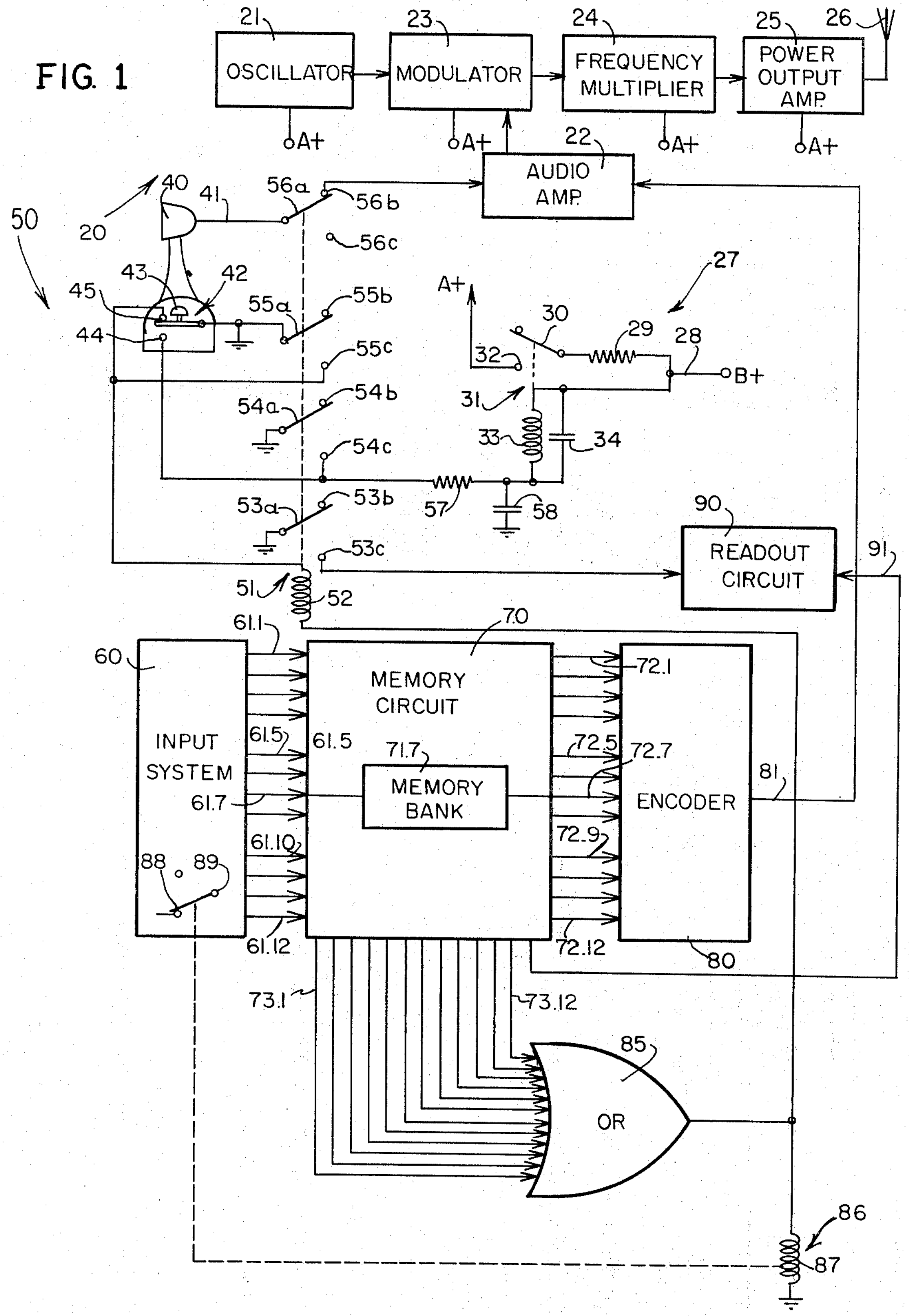
FIG. 1 illustrates a transmitter partially in block and partially in schematic, including therein a system for transmitting priority messages and secondary messages, which incorporates the features of the present invention.

Referring now to the drawings, and more particularly to FIG. 1 thereof, there is shown a communication transmitter 20 made in accordance with and embodying the principles of the present invention. Transmitter 20 is adapted to generate an RF carrier wave modulated selectively by audio signals constituting a priority message and intermittently by a secondary message, which in FIG. 1, is a control tone, or alternately could be a digital code signal. Basically, the transmitter 20 is for use in a selective calling communication system which comprises, in addition to the transmitter, a number of paging receivers, all capable of processing the same frequency carrier wave. Each receiver responds to a carrier wave modulated by the proper control tone or set of control tones for which that receiver is designed. Each receiver will respond to a different control tone or other code signal for which that receiver is designed. Each receiver will respond to a different code signal, whereby the operator at the transmitter can call a selected receiver without energizing any of the other receivers. The selected receiver will produce a tone or other alerting signal.

The transmitter 20 includes an oscillator 21 which develops on its output a relatively low frequency oscillatory signal. An audio amplifier 22 has its output coupled to a first input of a modulator 23, the second input thereof being coupled to the output of the oscillator 21. The signals from the audio amplifier 22, which may be a voice message or the tones, are modulated by the modulator 23 onto the relatively low frequency oscillatory signal. The modulated oscillator signal is applied to a frequency multiplier 24 which increases the frequency of the oscillatory signal. The relatively high frequency signal is applied to a power output amplifier 25 wherein the signal strength is increased, thereby to provide a high level, frequency-multiplied carrier wave which is emitted from an antenna 26.

The transmitter 20 also includes a power supply 27 having a conductor 28 on which appears a B+ DC voltage. In a stationary transmitter, the B+ voltage is supplied by rectifying a conventional 117-volt 60-cycle AC source, and in a mobile transmitter, it is typically supplied by batteries or a portable generator. The conductor 28 is coupled via a resistor 29 to one contact 30 of a relay 31, which relay 31 has a second contact 32 and a relay winding 33. The relay 31 is energized, in a manner to be presently described, to close the contacts 30 and 32, which provides an A+ operating voltage for the various elements of the transmitter 20, including, but not limited to, the oscillator 21, the audio amplifier 22, the modulator 23, the frequency multiplier 24, and the power amplifier 25.

The transmitter 20 also includes a microphone 40 having associated therewith an output conductor 41 and a push-to-talk switch 42 having a movable contact 43 coupled to ground and a pair of fixed contacts 44 and 45. The push-to-talk switch 42 has a first position when the contact 43 engages the contact 45 and a second position when the contact 43 engages the contact 44. The movable contact 43 is spring-biased to the first position.

The transmitter 20 includes a system 50 which provides priority messages and secondary messages. The system 50 includes a relay 51 having a relay winding 52, a movable contact 53*a* coupled to ground, and associated fixed contacts 53*b* and 53*c;* a movable contact 54*a* coupled to ground and associated fixed contacts 54*b* and 54*c;* a movable contact 55*a* coupled to ground and associated fixed contacts 55*b* and 55*c;* and a movable contact 56*a* coupled by way of the conductor 41 to the microphone 40 and associated fixed contacts 56*b* and 56*c*. One end of the relay winding 52 and the contact 55*c* are coupled to the contact 45 of the switch 42. The contact 54*c* is coupled to the contact 44 of the switch 42 and also through a resistor 57 to the relay winding 33, there also being provided a capacitor 58 to ground for filtering purposes. The contact 56*a* is coupled to an input of the audio amplifier 22.

There is also provided an input system 60 for generating a secondary message in the form of electrical signals which may merely consist of a set of pulse generators for providing pulses respectively on the outputs 61.1–61.12. In the particular embodiment shown the input system has 12 outputs, so that the input system would include means to provide a pulse at any one of the outputs. Thus, for example, if a pulse was desired at the output 61.5, the associated generator in the input system 60 would be actuated to provide a pulse.

There is provided a memory circuit 70 having a number of inputs corresponding to the number of outputs of the input system 60 for respectively receiving the pulses therefrom. The memory circuit 70 includes a number of memory banks, one memory bank 71.7 being depicted. The memory circuit 70 also has a first set of outputs 72.1–72.12 and a second set of outputs 73.1–73.12, the number of outputs in each set corresponding to the number of inputs to the memory circuit 70. Each memory bank, such as the memory bank 71.7, may be an astable multivibrator which is in one state when no input thereto is provided and is in an opposite state when an input is provided. Thus, if the generator in the input system 60 corresponding to the output 61.7 is actuated so as to provide a pulse, such pulse would convert the memory bank 71.7 from one stable state to the other stable state. Since none of the other memory banks would have pulses applied thereto, they would all be in the first stable state.

The outputs 72.1–72.12 of the memory circuit 70 are coupled to an encoder 80, which, in its simplest form, consists of a plurality of oscillators respectively coupled to the outputs 72.1–72.12 of the memory circuit 70. It is recognized that instead of a series of oscillators, other circuits for generating pulse codes, could be used. The following descriptions will explain operation in more detail using tone oscillators as such. Each oscillator is constructed to generate a control tone of a predetermined frequency, but would not be operative unless a pulse were applied thereto. Thus, if a pulse 72.1 were present, and applied to the associated oscillator, the encoder 80 would generate a control tone corresponding to that oscillator. If, on the other hand, the memory circuit 70 provided a pulse on the output 72.9, the associated oscillator in the encoder 80 would develop a control tone of another predetermined frequency. The output of the encoder 80 is coupled to a second input of the audio amplifier 22.

The second set of outputs 73.1–73.12 is coupled to an OR circuit 85, which serves as a message presence detector, the output of which is coupled to a relay 86 having a relay winding 87 and a pair of contacts 88 and 89. If a pulse is developed by the input system 60 on any of the outputs 61.1–61.12, a signal will appear on the corresponding one of the outputs 71.1–71.12. The OR circuit 85, in the presence of a signal on any one of the inputs thereto, will cause current to flow through the winding 87, thereby energizing the relay 86 and causing the contacts 88 and 89 to open. The contacts 88 and 89 are arranged to control application of pulses from the input system 60 to the memory circuit 70. With the contacts 88 and 89 open, further pulses could not be applied to the memory circuit 70, whereas, when closed, the contacts 88 and 89 permit the application of pulses to the memory circuit 70. Also, means may be provided to furnish a "busy signal" when the contacts 88 and 89 are open. Thus, once a pulse is applied to any one of the inputs of the memory circuit 70, the OR circuit 85 will energize the relay 86 and prevent application of further pulses. The output of the OR circuit 85 is also coupled to the remaining end of the winding 52 of the relay 51.

Associated with the memory circuit 70 is a readout circuit 90 having its input coupled to the contact 53*c* on the relay 51 and its output coupled to the memory circuit 70.

In operation, when the operator wishes to speak into the microphone 40 in order to transmit a priority message, he depresses the contact 43 on the push-to-talk switch 42 so as to engage the contact 44. This completes a path from ground reference potential, through the contacts 43 and 44, through the resistor 57, the relay winding 33 and the B+ supply voltage on the conductor 28. The current which is thereby caused to flow through the winding 33 causes energization thereof so as to close the contacts 30 and 32 and thereby furnish the A+ supply voltage. The A+ supply voltage is delivered to the various elements of the transmitter 20 so as to cause the same to furnish a carrier wave as previously explained. Nothing thus far has affected the relay 51, so that the contact 56*a* is coupled to the contact 56*b* to complete a path from the microphone 40 to the audio amplifier 22. With the transmitter 20 generating a carrier wave, the operator may speak into the microphone 40 which converts the sounds applied thereto into electrical signals. These electrical signals are applied to the audio amplifier 22 which amplifies them and applies them to the modulator 23. The modulator 23 modulates the signal produced by the oscillator 21 in accordance with the electrical signals from the microphone 40.

As long as the operator is speaking into the microphone 40, he will maintain the switch 42 actuated. As soon as he has completed his voice or priority message, he releases the switch 42 which is spring-biased to return to the open condition shown in FIG. 1.

If, during the time that a voice message is being transmitted, a secondary message furnished in the input system 60 is applied to the memory circuit 70, a positive DC voltage will be furnished by the OR circuit 85 as previously explained. The positive voltage on one side of the relay winding 52 and the grounded condition of the other side of the winding 52 cause energization of the relay 51, thereby pulling the movable contacts 53*a*–56*a* downwardly. Now the contact 56*a* is disengaged from the contact 56*b*, so that, if the operator spoke into the microphone 40 at this time, the resultant electrical signals on the conductor 41 would not be applied to the audio amplifier 22. The movable contact 55*a* will engage the contact 55*c* so as to maintain ground reference potential on the upper end of the relay winding 52, even if the contact 43 is later depressed. The movable contact 54*a* engages the contact 54*c* so as to maintain energization of the winding 33 and, in turn, to continue the supply of power to the transmitter 20. Thus, the carrier wave is not interrupted, and the contacts 54*a* and 54*c* constitute a holding circuit. The capacitor 34 maintains the relay 33 energized during the transition from one message source to another.

Also, the contact 53*a* engages the contact 53*c* to furnish a control signal, in the form of ground reference potential, for application to the readout circuit 90. The readout circuit 90 is responsive to the ground reference potential on its input to apply a signal along the conductor 91 to the memory circuit 70. The memory circuit 70, in response to this signal, will release the stored information to the encoder 80. The readout circuit may constitute a scanning device which sequentially senses each memory bank 71.1–71.12 to determine whether a pulse has been applied thereto. If so, assuming the memory bank 71.7 has had a pulse applied thereto, then the readout circuit 90 will cause the memory bank 71.7 to release an output pulse for application to the encoder 80. As previously explained, the output 72.7 will energize the associated oscillator in the encoder 80 to cause the associated control tone to be produced. That control tone will be applied along the conductor 81 back to the audio amplifier 22 which amplifies the control tone and applies it to the modulator 23. The modulator 23 modulates the signal produced by the oscillator 21 in accordance with the control tone from the encoder 80. Thus, the relay 51 serves as an AND circuit responsive to the concurrence of the absence of priority message (the switch 42 is in the position of FIG. 1) and the presence of a secondary message (the OR circuit 85 develops an output) to provide a control signal for application to the readout circuit 90.

If, while the control tone is being transmitted, the operator actuates the push-to-talk switch 42 for the purpose of speaking into the microphone 40, the voice message will be isolated from the audio amplifier 22 by virtue of the contacts 56*a* and 56*b* being open. Actuation of the switch 42 also would have no effect on the control tone which is in the process of transmission. However, the control tone would have a duration of less than several hundred milliseconds, which is not so long as to lose any of the voice message. In other words, by the time the operator actually speaks, the control tone transmission, in all likelihood, will have been completed.

As soon as the control tone has terminated, so that there is no signal on any of the outputs 73.1–73.12 of the memory circuit 70, the voltage furnished by the OR circuit 85 will likewise terminate. The relay 51 will become de-energized and the movable contacts 53*a*–56*a* will assume the respective positions shown in FIG. 1. The transmitter 20 is now in condition again to send a voice message.

Thus, the same transmitter can be used to transmit voice messages when desired and, during those intervals in which no voice messages are being transmitted, provide control tones to activate paging receivers.

The system 50 of FIG. 1 is preferably used in a duplex communication system in which the transmitter of one transmitter-receiver combination transmits at a frequency different from that of a transmitter of other transmitter-receiver combinations. The transmitter 20 may be part of a base station capable of transmitting at a given carrier frequency (usually would be capable of transmitting at a number of selected frequencies) to voice communicate with a mobile transmitter-receiver and selectively actuate a number of paging receivers. When a voice message is completed by the base station transmitter to the mobile receiver, the stored paging calls may be transmitted to the same carrier wave frequency to the paging receivers without affecting the two-way communication between the base station and the mobile voice receiver. That receiver can transmit its reply on its own carrier wave frequency, so as not to interfere with the stored paging messages which are then being transmitted by the base station.

Although the memory circuit 70 has been described as one capable of accepting but a single secondary message, it is to be appreciated that an input system capable of accepting a number of secondary messages may be provided. With such a system, a single communications channel is capable of use, both for one-way paging and voice communications. If the transmitter 20, which would be part of a base station, is in communication with a mobile unit, a paging call may be applied by way of the input system 60 to the memory circuit 70. If a voice message at that time is being transmitted, the paging call will be stored. If the communication is a long one, a number of paging calls may have been applied by way of the input 60 to the memory circuit 70, if the circuit 70 is capable of storing more than one message. After completion of the voice message, the tones are sent seriatim. In the case of tone-only paging, the code signals are short in duration and may be transmitted at a rate of several per second. Accordingly, a great number of these paging calls may be transmitted before all of the next voice transmission. When the operator, who is exercising manual control over the transmitter 20, wishes to transmit a voice message before the stored paging calls have been released, he actuates the push-to-talk switch 42. At the end of the very next paging call, not further paging calls will be sent and the voice message can be transmitted. Since the operator usually takes at least 200 milliseconds to begin speaking after actuating the push-to-talk switch 42, no part of the voice message will be lost. In other words, the operator can totally ignore the fact that the channel is also being used for paging transmissions.

It is to be understood that the various elements shown in block form in FIG. 1 are well-known to those skilled in the art, so that detailed description of the components of each of the block is unnecessary. The memory circuit 70, and the readout circuit 90 may, in a preferred form, be provided in a single unit. For example, there may be used a device made by Texas Instruments Incorporated of Dallas, Texas, which it calls a Digital Storage Buffer under the identification TMS 4006 JC, NC. This circuit can provide for storage of many messages in sequence and can then release any or all of them in sequence on demand. The priority message would then interrupt the flow of these messages at the end of any one of them in process at the time the microphone switch is actuated. It is readily understood that the messages can be stored in any appropriate binary code rather than decimal as desired. Alternatively the memory circuit may be a tape recorder. The encoder 80 also could be a circuit having several binary messages, other than tones, which the memory circuit selects on demand.

Figures 2, 3:
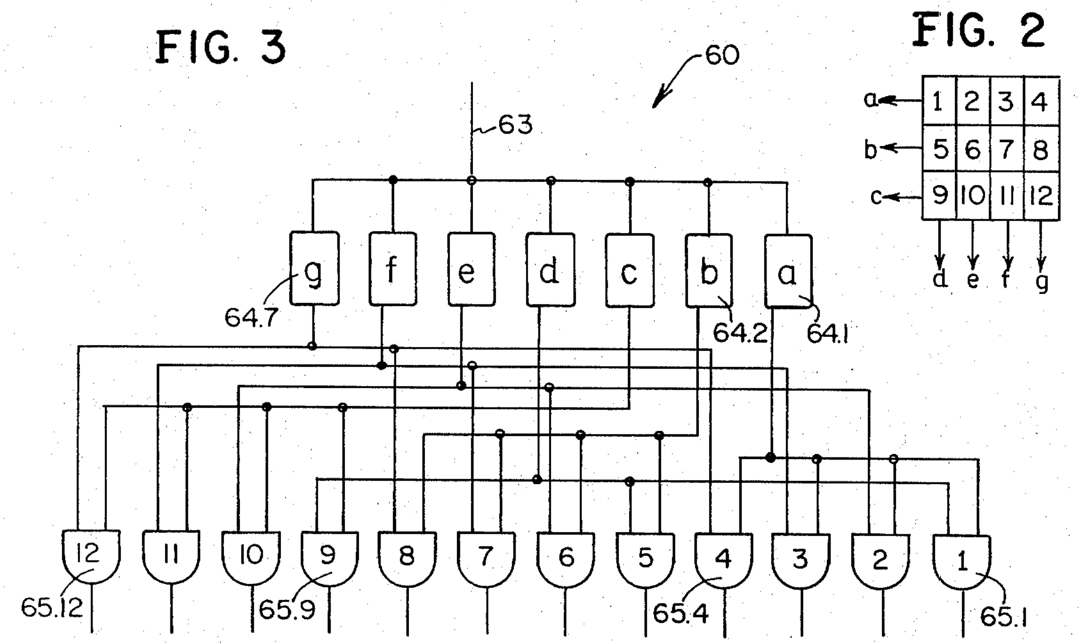
FIG. 2 is a schematic view of a console having a set of 12 buttons, which console may comprise one element of the input system of FIG. 1.
FIG. 3 illustrates in block form two out of seven decoders suitable for detecting outputs from a telephone Touch Tone input, and thereby providing individual output similar to that provided by a telephone Interface Trunk Circuit, constituting a further element of the input system of FIG. 1.

Turning now to FIGS. 2 and 3, there is shown a representative form of the input system 60 including elements of a telephone system. FIG. 2 depicts schematically a set of 12 push buttons as may appear on a TOUCH-TONE (AT & T registered trademark) telephone. When the user of the telephone depresses, for example, the button bearing the designation "1," tones *a* and *d* are furnished; if button 7 is depressed, tones *b* and *f* are furnished, etc.

In FIG. 3, the telephone line 63 is coupled to a piece of equipment which provides output pulses in response to a dialed input. It could be replaced by an INTERFACE TRUNK CIRCUIT (AT & T trademark) manufactured by Western Electric under the number SD66926, instead of the system 60 shown. This unit can convert either dialed pulses or tones to produce momentary output signals as shown in FIG. 3 and also supplies dial tones, busy signals, etc., as described more fully in various Western Electric publications on this circuit. This circuit includes a set of seven-tone responsive circuits 64.1–64.7 in which the circuit 64.1 is responsive only to tone *a*, the circuit 64.2 is responsive to tone *b*, etc. The outputs 64.1–64.7 of the circuit are coupled to a set of twelve gated pulse generators 65.1–65.12. For example, the circuit 64.1 is coupled to the four generators 65.1–65.4, and the circuit 64.7 is coupled to the three generators 65.4, 65.8, and 65.12. Thus, if the signal on the telephone line 63 included the tones *a* and *g*, the gated pulse generator 65.4 would have 2 inputs applied thereto and it would generate a pulse. If the tones on the telephone line 63 were, for example, *c* and *d*, then the pulse generator 65.9 would be activated.

In order to provide a connection between the unit shown in FIG. 2 and the unit shown in FIG. 3, a standard telephone number would first be dialed. Once that number was dialed, a direct connection would be provided between the unit of FIG. 2 and the telephone line 63. If the caller wishes to page the person carrying the pager represented by the number 9, he would depress the button labeled "9," which would cause a pulse to be generated by the generator 65.9. The pulse would be stored in the memory circuit 70, as previously explained. When the voice message being transmitted has been completed, the pulse is released and applied to the encoder 80 which generates the tone corresponding to the oscillator coupled to the output 72.9. That tone will be transmitted so as to activate the pager tuned to that frequency.

Figure 4:
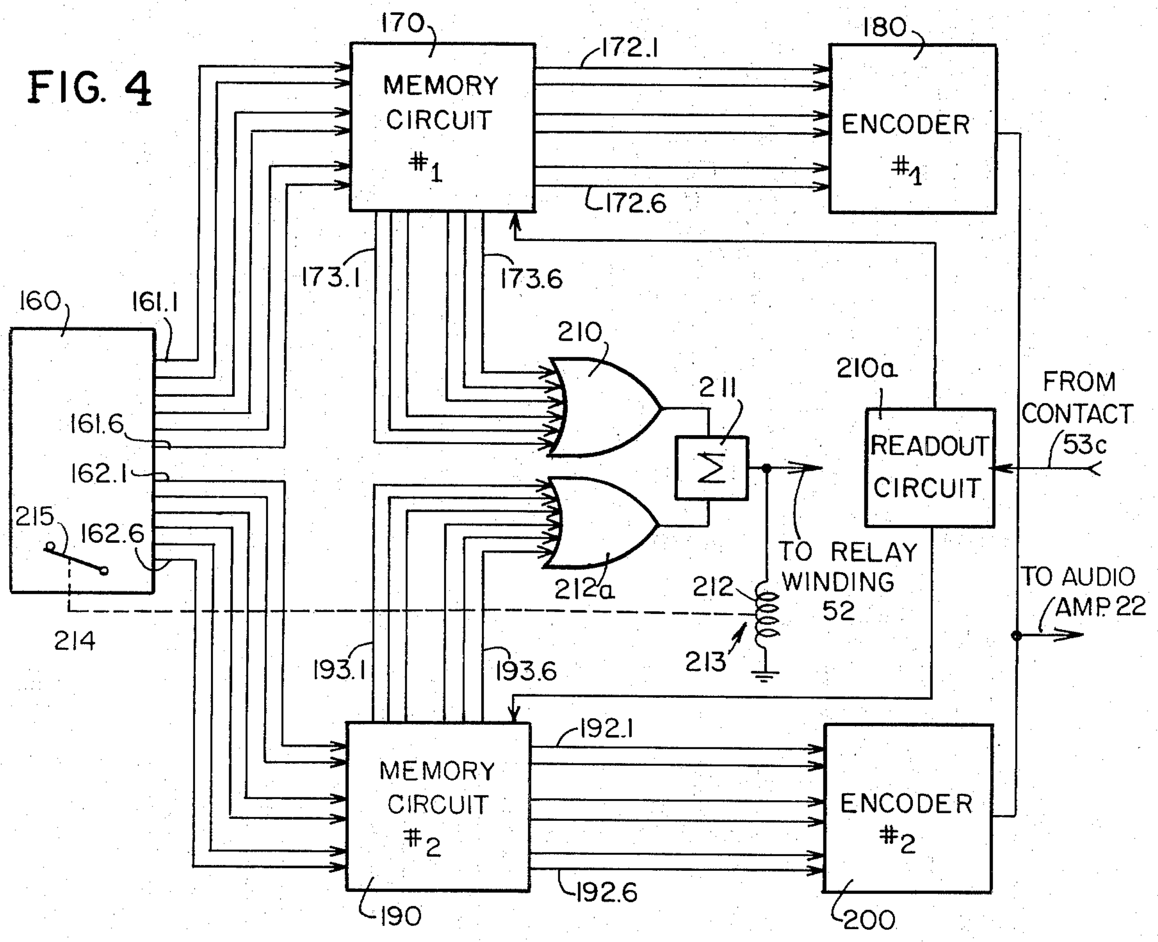
FIG. 4 illustrates a second embodiment of a system for automatically transmitting priority messages and secondary messages, wherein the secondary message consists of two tones.

Turning now to FIG. 4, there is illustrated a further form of the invention in which two tones are to be transmitted, either sequentially or simultaneously depending on the particular system. There is provided an input system 160 which has two sets of outputs 161.1–161.6 and 162.1–162.6. In this system, the first button depressed would cause a pulse to appear on one of the outputs 161.1–161.6, and the second button depressed would cause a pulse to appear on one of the outputs 162.1–162.6. Although two sets of six outputs each are shown, it should be understood that each set could include 12 outputs as in the system in FIG. 1, or any number, for that matter.

There is provided a first memory circuit 170 having a number of inputs corresponding to the number of outputs 161.1–161.6 of the input system 160. The memory circuit 170 has a plurality of outputs 172.1–172.6. The outputs 172.1–172.6 are coupled to a first encoder 180 which may consist of a set of six oscillators respectively coupled to the outputs of the memory circuit 170. Each oscillator is constructed to generate a control tone of a predetermined frequency if a pulse is applied thereto. The encoder 180 may have a construction basically like that described in respect to the encoder 80. There is also provided a second memory circuit 190 having a number of inputs corresponding to the number of outputs 162.1–162.6 of the input system 160. The memory circuit 190 has a plurality of outputs 192.1–192.6. The outputs 192.1–192.6 are coupled to a second encoder 200 which is like the encoder 180.

If, during the time that a voice message is being transmitted, a first pulse is applied by way of the input circuit 160 to one of the outputs 161.1–161.6, and a second pulse is applied by way of input circuit 160 to one of the outputs 162.1–162.6, the pulses will respectively be stored in the memory circuits 170 and 190, much like that described in respect to the system of FIG. 1.

Associated with the memory circuits 170 and 190 is a readout circuit 210*a* having its input coupled to the contact 53 on the relay 51 and a pair of outputs respectively coupled to the memory circuits 170 and 190.

A second set of outputs 173.1–173.6 of the memory circuit 170 is coupled to an OR circuit 210, the output of which is coupled to a first input of an AND circuit 211. If a pulse is developed by the input system 160 on any of the outputs 161.1–161.6, a signal will appear on the corresponding one of the outputs 173.1–173.6. The OR circuit 210, in the presence of a signal on any one of the inputs thereto, will provided a first input to the AND circuit 211. A second set of outputs 193.1–193.6 of the memory circuit 190 is coupled to the OR circuit 212*a*, the output of which is coupled to a second input of the AND circuit 211. If a pulse is developed by the input system 160 on any of the outputs 162.1–162.6, a signal will appear on the corresponding one of the outputs 193.1–193.6. The OR circuit 212*a*, in the presence of a signal on any one of the inputs thereto, will provide a second input to the AND circuit 211. The AND circuit 211, in the presence of signals on both inputs thereto, will cause current to flow through the winding 212 of a relay 213 having contacts 214 and 215, thereby energizing the relay 213 and causing the contacts 214 and 215 to open. The AND circuit 211 serves as a message presence detector and in this particular illustration also indicates that the memory circuits are loaded to capacity. In the case of utilization of larger storage facilities, such as the digital buffer previously mentioned, separate message presence detectors and memory full signals will be generated by use of appropriate modulator signals. As was the case in the system of FIG. 1, the open contacts will prevent further secondary messages from being processed. The AND circuit 211 is also coupled to the relay winding 52.

If the system is constructed to use a pair of simultaneous tones, then the appropriate pulse for one tone is applied to the memory circuit 170 in which it is stored, and the appropriate pulse for the second tone is applied to the memory circuit 190 in which it is stored. Each OR circuit 210 and 212a will have an output therefrom to which outputs the AND circuit 211 is responsive to provide energizing current for the relay winding 52, assuming no voice message at that time is being transmitted, that is, the switch 42 is not actuated. A control signal (ground reference potential in this case) is developed on the contact 53c which is applied to the readout circuit 210. The readout circuit 210 then develops signals for application respectively to the memory circuits 170 and 190, thereby causing them to release on the respective outputs thereof the stored signals. The output of the memory circuit 170 on which the signal appears will energize the associated oscillator in the encoder 180 to cause the associated control tone to be produced. Similarly, the output of memory circuit 190 on which the signal appears will energize the associated oscillator in the encoder 200 to cause the associated control tone to be produced. The control tones respectively from the encoders 180 and 200 will be applied to the audio amplifier 22 which amplifies the simultaneous control tones and applies them to the modulator 23. A selective receiver tuned to those two tones will be energized thereby to produce an alerting signal.

Figure 5:
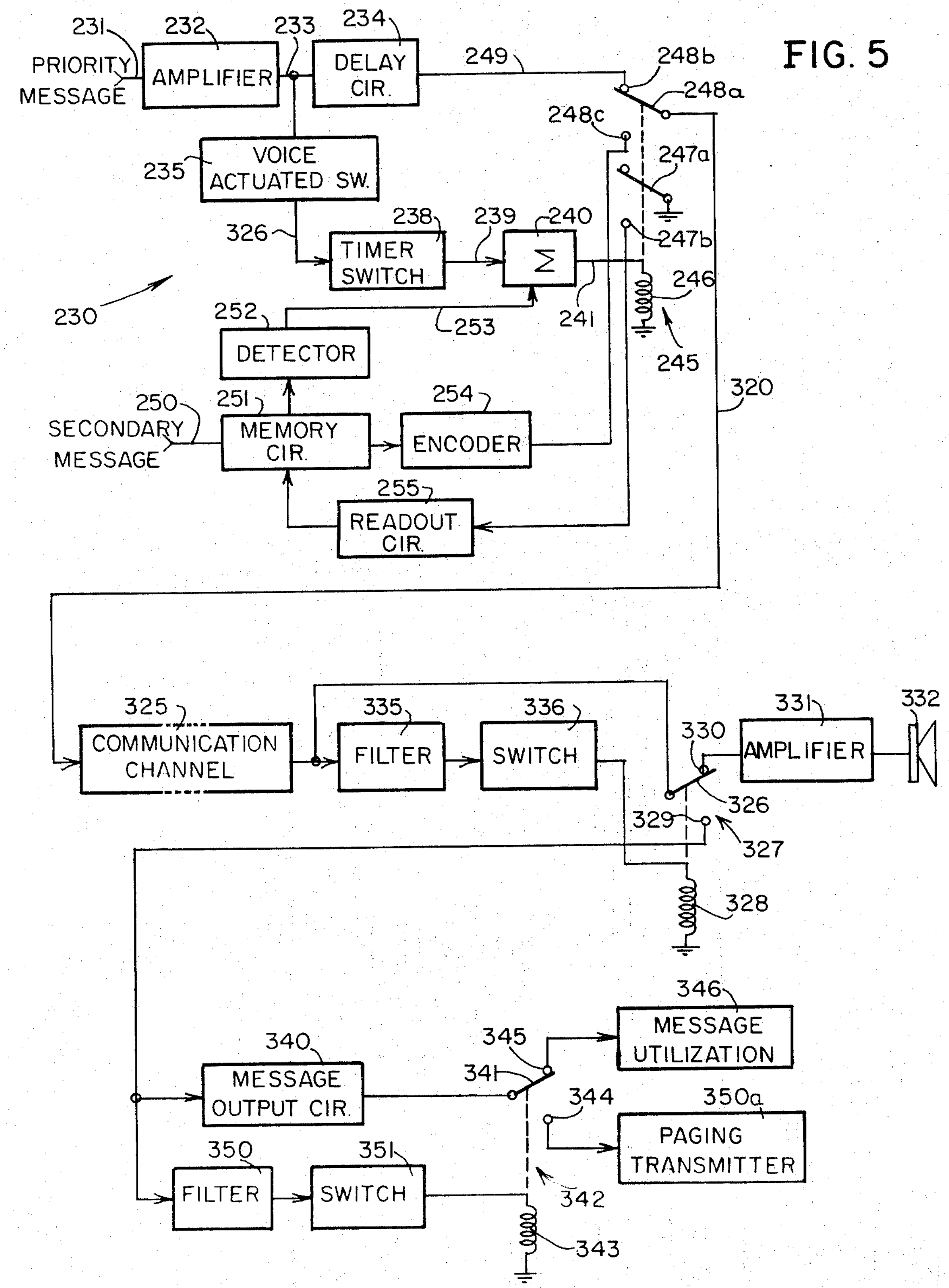
FIG. 5 illustrates a transmitter partially in block and partially in schematic, including yet another form of a system for transmitting priority messages and secondary messages.

Turning now to FIG. 5, another embodiment of the instant invention will be described. There is shown a communication system 230 having a conductor 231 on which appears a priority message. The priority message may be derived from a microphone such as shown in FIG. 1 or other suitable means. The priority message is applied to an amplifier 232 in which it is amplified and applied along a conductor 233 to a delay circuit 234. The delay circuit 234 is of the analogue type capable of delaying an audio signal a predetermined time. One type of delay line that may be used is described in *Philips Technical Review*, Vol. 31, No. 4, pp. 97–110, 1970. The conductor 233 is also coupled to a voice actuated switch 235 which is responsive to audio signals exceeding a predetermined value to close a switch and couple a DC voltage along the output conductor 236 coupled to a timer switch 238 which may be a monostable multivibrator. The timer switch 238 is responsive to the opening of the switch 235 to provide a delayed DC voltage lasting for a predetermined duration. The pulse thereby developed is applied along a conductor 239 as a first input to an AND circuit 240, the output of the AND circuit 240 being on a conductor 241. The conductor 241 is coupled to a relay 245 having a winding 246, a contact 247*a* coupled to ground and an associated contact 248*a*; a contact 248*a*, an associated contact 248*b* coupled by way of a conductor 249 to the delay circuit 234, and an associated contact 248*c*.

The communication system 230 includes a conductor 250 on which appears a secondary message. The secondary message is applied to a memory circuit 251 which may have a construction like the memory circuit 70 of FIG. 1. The memory circuit 251 is coupled to a signal detector 252 which will provide an output signal on its conductor 253 when a secondary message is being stored in the memory system 251. The detector 252 may be an OR circuit, such as is schematically shown in FIG. 1, so as to sense the presence of any secondary message being stored in the memory circuit 251. The conductor 253 is connected to a second input of the AND circuit 240. The output of the memory circuit 251 is coupled to an encoder 254 constructed like the encoder 80 of FIG. 1. Thus, when it receives a suitable signal from the memory circuit 251, the encoder 254 will produce a control tone. Although schematically shown as having but a single output, it is contemplated that the memory circuit 251 may have a plurality of outputs coupled to a corresponding plurality of inputs to the encoder 254. Each input will correspond to an oscillator frequency in the encoder 254, whereby the control tone produced will depend upon which input of the encoder 254 receives a signal. The system 230 also includes a readout circuit 255 having its input coupled to the contact 247 *b* on the relay 245 and its output coupled to the memory circuit 251.

Figure 6:
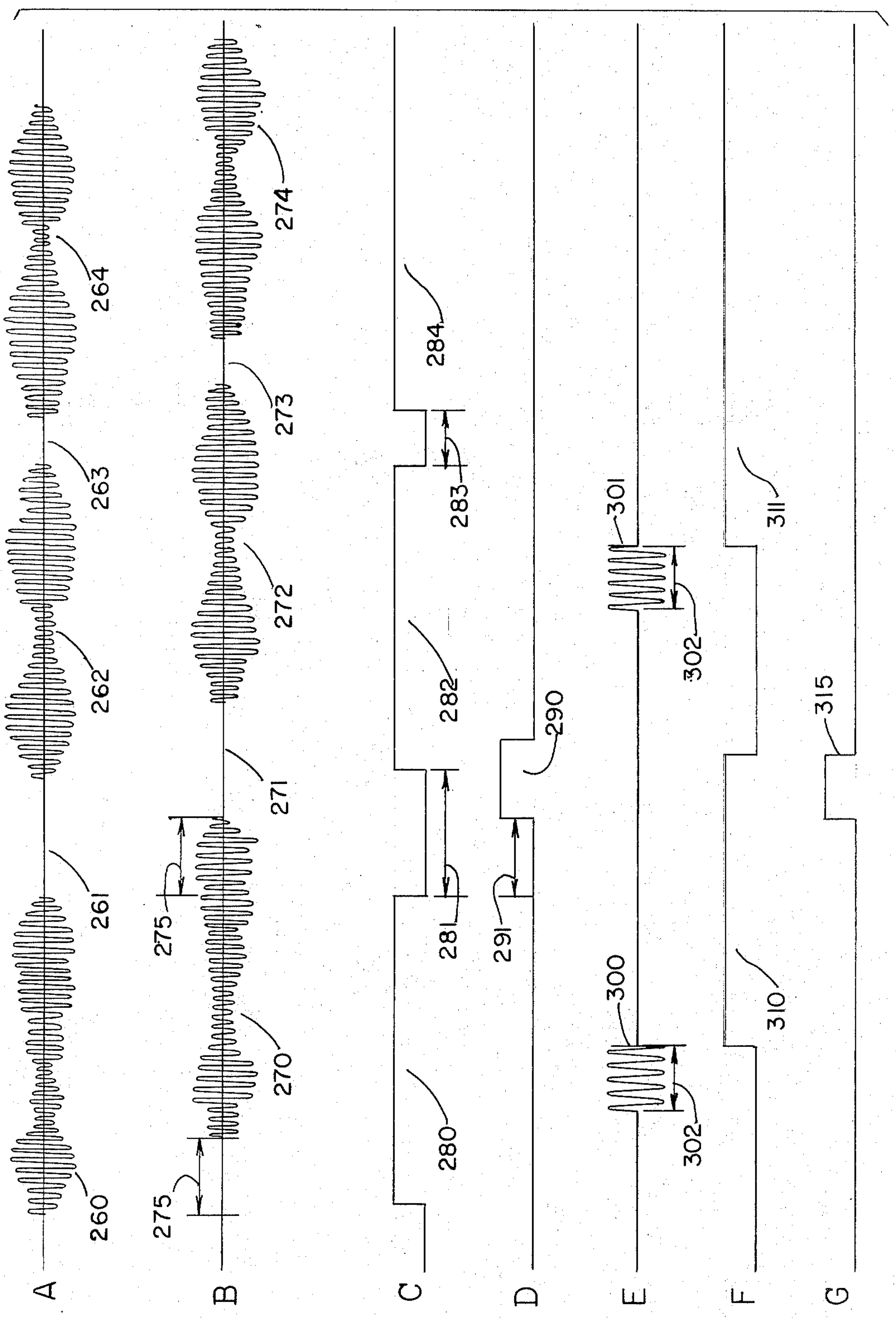
FIG. 6 illustrates wave forms at various points in the transmitter of FIG. 5.

Referring to both FIGS. 5 and 6, a priority message is being applied to the conductor 231, such as by speaking into a microphone connected thereto. The priority message appearing on the conductor 231 is shown in FIG. 6A. The priority message includes a burst of speech 260 followed by a gap 261 during which no speech is present, followed by a second burst of speech 262, followed by a shorter gap 263 during which no speech is present, followed by a burst of speech 264. In the ensuing discussion it will be assumed that the bursts of speech 260, 262, and 264 are successive priority messages which are electrical signals derived, for example, from a microphone. The priority message is amplified in the amplifier 232 and then applied to the delay circuit 234 which delays the priority message, thus to provide a signal on the conductor 249 shown in FIG. 6B. The delayed priority message includes corresponding bursts of speech 270, 272, and 274, together with intervening gaps 271 and 273 during which no speech is present. The commencement of the priority message appearing on the conductor 249 is delayed a predetermined time 275 from the commencement of the priority message 260 appearing on the conductor 231. Thus, the end of the first burst of speech 270 will be delayed by the same predetermined time 275. The commencement of the gap 271 will be delayed the same predetermined time 275, as will the subsequent bursts of speech 272 and 274 and the gap 273.

The priority message, after amplification, is applied to the voice actuated switch 235 which closes in response to a predetermined level of speech. The switch 235 has a slight delay built therein, so that it will not become actuated in response to a noise spike. Also the switch 235 has fast reset properties, so that short voice messages are not lost. The output on the conductor 236 is shown in FIG. 6C wherein a pulse 280 commences slightly after the first burst of speech 260 (due to the delay in the switch 235) and lasts until termination of the first burst of speech 260. Successive pulses 282 and 284 commence slightly after the bursts of speech 262 and 264 respectively. For the duration of the gap 261 during which no speech is present, and for a very short time thereafter, there is a gap 281 between successive pulses 280 and 282. Similarly, there is a gap 283 between the pulses 282 and 284.

Referring to FIG. 6D, the timer switch 238 responds to the termination of the pulse 280 and the absence thereof for a predetermined time 291 to furnish a pulse 290. The timer portion of the switch 238 is so constructed that the pulse 290 will have a predetermined duration no greater than the predetermined time 275. Thus, if the duration of the gap between successive pulses 280 and 282 is not equal to or greater than the predetermined time interval 291, no pulse will be furnished by the timer switch 238 on the conductor 239. Thus, the duration of the gap 283 between successive pulses 282 and 284 is less than the duration of the interval 291, whereby no pulse will be furnished on the conductor 239.

The waveform of FIG. 6E illustrates a pair of secondary messages 300 and 301 on the conductor 250 being applied to the memory circuit 251. Each of the secondary messages 300 and 301 lasts for a duration 302. Since the secondary messages 300 and 301 are present during the transmission of bursts of speech 260 and 262 respectively, they will be stored in the memory circuit 251 in much the same manner as that described in respect to the embodiment of FIG. 1.

Referring to FIG. 6F, when the first secondary message 300 terminates, the detector 252 responds thereto, providing a pulse 310 that commences with the termination of the message 300 and lasts until the message is released from the memory circuit 251. The pulse 310 is applied as a second input to the AND circuit 240, the AND circuit 240 being responsive to the presence of the inputs on the conductor 239 and on the conductor 253 to provide a voltage on the conductor 241. Between the commencement of the pulse 290 and the termination of the pulse 310 (the duration 302), the AND circuit 240 will have both inputs applied thereto, therefore providing on the conductor 241 a control pulse 315 (See FIG. 6G) lasting for the transmission duration 302. The termination of the message 300 disrupts the signal applied by the detector 252, as shown by the pulse 310 terminating with the termination of the pulse 315.

The pulse 315 renders operative the relay 245 to pull down the movable contacts 247*a* and 248*a*, thereby grounding the contact 247*b*, which ground serves as a control signal. The readout circuit 255 is responsive to the control signal to cause the memory circuit 251 to release the stored secondary message to the encoder 254. The control tones will be generated in the manner explained in respect to FIG. 1, which control tones are applied by way of the contacts 248*c* and 248*a* to the conductor 320.

Since the second secondary message 301 also is applied during a priority burst of speech 262, it will be stored in the memory circuit 251. Upon termination of the message 301, a pulse 311 is provided that commences with the termination of the message 301 and lasts until the message is released from the memory circuit 251. The pulse 311 is applied as a second input to the AND circuit 240. However, the AND circuit 240 does not have an input from the conductor 239, as can be seen by the waveform of FIG. 6B, since the duration of the gap 283 between the successive pulses 282 and 284 does not exceed the duration 291. Accordingly, without the first input on the conductor 239, no output will appear on the conductor 241, as is shown by the graph of FIG. 6G. Thus, the pulse 311 is shown to continue indefinitely. It will cease after the secondary message 301 has been released from the memory circuit 251.

Summarizing, if a priority message is applied to the conductor 231, it will be amplified in the amplifier 232 and delayed in the circuit 234. The relay 245 will be in the condition shown in FIG. 5, whereby the delayed priority message will be coupled to the conductor 320. If a secondary message is applied to the memory circuit 251 during the source of a priority message transmission, the memory circuit 251 will store the secondary message. The detector 252 will provide an input to the AND circuit 240 upon completion of the secondary message, which AND circuit 240 will energize the relay 245 upon termination of the priority voice message. At that time the relay 245 will be energized, thereby to cause the memory circuit 251 to release the information stored therein and apply it to the encoder 254. The output of the encoder 254 is coupled through the contacts 248*c* and 248*a* to the conductor 320. During the transmission of a secondary message, a priority message will not arrive at the conductor 320, since the contacts 248*a* and 248*b* are open.

The fact that the priority signal which is actually transmitted is slightly delayed will have no adverse effect, since such delay is not so long as to make the user aware of the delay. In other words, the delay should not interfere with normal communications. The predetermined time 291 is, in one form of the invention, 50 milliseconds. Thus, if two bursts of speech are less than 50 milliseconds apart, the secondary message will not be released. On the other hand, if the duration of the gap between successive bursts is greater than 50 milliseconds, the stored message will be released during that gap. Of course, it is because the priority message is delayed which enables useful detection of the duration of the gap between successive bursts of speech. The duration of the pulse 290 as determined by the parameters of the timer switch circuit 238, should be such as to insure that a complete secondary message will be transmitted. If, for example, the secondary message constitutes a control tone or set of control tones, it will be known precisely how long the secondary message will be. In one form of the invention, the delay 275, the predetermined time 291, and the duration of the pulse 290 were equal.

The conductor 320 is coupled to a communication channel 325, which communication channel, in the case of a radio frequency system, would include the carrier wave generating circuit elements and modulator of FIG. 1, together with corresponding receiver element to detect the audio information in the modulated carrier wave. The output of the communication channel 325 is coupled to a contact 326 of a relay 327, which relay 327 also has a winding 328 and contacts 329 and 330. The contact 330 is coupled to an audio amplifier 331, the output of which is coupled to a loudspeaker 332. The output of the communication channel 325 is also coupled to a filter 335 which is responsive to a single tone and to none other. The output of the filter 335 is coupled to an electronic switch 336 which is, in turn, coupled to one end of the relay winding 328, the other end thereof being coupled to ground reference potential.

The contact 329 of the relay 327 is coupled to an output circuit 340, which, in its simplest form, is merely an dudio amplifier. The output of the output circuit 340 is coupled to the movable contact 341 of a relay 342, which relay 340 also has a winding 343 and fixed contacts 344 and 345. The contact 345 may be coupled to a message utilization circuit 346 which, for example, may be a computer where the message consists of data. The contact 349 of the relay 327 is also coupled to a filter 350 which will provide an output in the presence of a predetermined tone. Usually the filters 335 and 350 are responsive to different tones. An electronic switch 351 has its input coupled to the output of the filter 350 and has its output coupled to the relay winding 343.

In operation, whether the communication channel 325 consists of transmitter and receiving equipment or a direct wire, it will provide at its output the signal appearng on the conductor 320. If the priority message is being transmitted, it will be applied through the contacts 326 and 330, amplified in the amplifier 331 and reconverted into sound waves by the loudspeaker 332.

If two bursts of speech are sufficiently separated and a secondary message is stored in the memory circuit 251, the secondary message will appear on the conductor 320, all as previously described. It will be assumed that the secondary message includes data and a control tone superimposed on the data, but in a different frequency range. Further, if the control tone is that to which the filter 335 is tuned, an output will be developed by the filter 335, which output will actuate the switch 336 to energize the winding 328, thereby moving the movable contact 326 into engagement with the contact 329. The data will now be rerouted to the output circuit 340, wherein the data will be amplified and applied by way of the contacts 341 and 345 to the message utilization circuit 346, which in this example is a computer.

Instead of data, the secondary message may include a second control tone for actuating paging transmitter. In that case, the first control tone would cause energization of the relay 327 as above explained and a second control tone, if, assuming it corresponds to that to which the filter 350 is tuned, will cause actuation of the switch 351 and thus energization of the relay 342. The contact 341 will thus be pulled into engagement with the contact 344, so that the second control tone will also be routed to the paging transmitter 350*a*. The paging transmitter upon receipt of the proper control tone, will transmit a predetermined signal to actuate a remote paging unit.

While there have been described what are at present considered to be the preferred embodiments of the invention, it is understood that various changes and modifications can be made therein without departing from the spirit and scope of the invention, and it is intended that all such changes and modifications be covered as fall within the scope of the appended claims.

What is claimed is:

1. A system for transmitting priority and secondary messages comprising first input means for the priority message, second input means for the secondary message, a memory circuit coupled to said second input means for storing a secondary message therefrom, circuit means coupled to said first input means and to said memory circuit and responsive only to the concurrence of the absence of a priority message and the presence of a secondary message to provide a control signal, readout means having an output coupled to said memory circuit and an input coupled to said circuit means and being responsive to said control signal to cause said memory circuit to release the stored secondary message, and an output circuit coupled to said first input means and to said memory circuit respectively for utilizing the priority messages and the secondary messages therefrom.

2. The system set forth in claim 1, wherein said first input means includes a microphone.

3. The system set forth in claim 1, wherein said second input means includes a plurality of signal generators and a plurality of actuators respectively coupled to said signal generators, a selected one of the signal generators being energized to furnish a secondary message therefrom by operating the associated actuator.

4. The system set forth in claim 1, wherein said second input means includes switch means to prevent application of secondary messages to said memory circuit, said switch means being coupled to said circuit means and responsive to said control signal to prevent application of subsequent secondary messages to said memory circuit until the first-received secondary message has been released.

5. The system set forth in claim 1, wherein said memory circuit includes at least one astable multivibrator to store the secondary message.

6. The system set forth in claim 1, wherein said circuit means includes means for disconnecting said first input means from said output circuit in the presence of said control signal.

7. The system set forth in claim 1, wherein said output circuit includes an encoder for generating a predetermined control tone in response to the presence of the secondary message.

8. A system for transmitting priority voice messages and secondary messages, said system comprising first input means for the priority voice message, voice actauted means coupled to said first input means and responsive to the absence of a priority voice message to provide an output signal, second input means for the secondary message, a memory circuit coupled to said second input means for storing a second message therefrom, circuit means coupled to said voice actuated means and to said memory circuit and responsive only to the concurrence of the presence of said output signal and the presence of the secondary message to provide a control signal, readout means having an output coupled to said memory circuit and an input coupled to said circuit means and being responsive to said control signal to cause said memory circuit to release the stored secondary message, and an output circuit coupled to said first input means and to said memory circuit respectively for utilizing the priority messages and the secondary messages therefrom.

9. The system set forth in claim 8, wherein said voice actuated means includes a switch to provide a DC output signal in the absence of the priority voice message.

10. A system for transmitting priority voice messages and secondary messages, said system comprising first input means for the priority voice message, a switch to be actuated when it is desired to transmit a priority voice message, second input means for the secondary message, a memory circuit coupled to said second input means for storing a secondary message therefrom, circuit means coupled to said switch and to said memory circuit and responsive only to the concurrence of the non-actuation of said switch and the presence of the secondary message to provide a control signal, readout means having an output coupled to said memory circuit and an input coupled to said circuit means and being responsive to said control signal to cause said memory circuit to release the stored secondary message, and an output circuit coupled to said first input means and to said memory circuit respectively for utilizing the priority messages and the secondary messages therefrom.

11. The system set forth in claim 10, wherein said circuit means is electrically coupled to said switch and electrically coupled to said memory circuit.

12. The system set forth in claim 10, wherein said first input means is coupled to said circuit means and is responsive to said control signal to prevent application of a priority voice message to said output circuit.

13. A system for transmitting priority voice messages and secondary messages, said system comprising first input means for the priority voice message, delay means coupled to said first input means for delaying the priority voice message a first predetermined time, voice actuated means coupled to said first input means and responsive to the absence of a priority voice message to provide an output signal, electronic switching means coupled to said voice actuated means and responsive only to the presence of said output signal for a second predetermined time to provide a further signal delayed from said output signal, second input means for the secondary message, a memory circuit coupled to said second input means for storing a secondary message therefrom, circuit means coupled to said electronic switching means and to said memory circuit and responsive to the concurrence of the presence of said further signal and the presence of the secondary message to provide a control signal, readout means having an output coupled to said memory circuit and an input coupled to said circuit means and being responsive to said control signal to cause said memory circuit to release the stored secondary message, and an output circuit coupled to said delay means and to said memory circuit respectively for utilizing the delay priority message and the secondary message therefrom.

14. The system set forth in claim 13, wherein said delay means includes a shift register.

15. The system set forth in claim 13, wherein said first and second predetermined times are substantially equal.

16. The system set forth in claim 13, wherein said electronic switching means includes a timer circuit responsive to said output signal persisting for said second predetermined time to cause said output signal to have a predetermined duration, said first and second predetermined times and said predetermined duration being approximately equal to one another.

17. The system set forth in claim 13, wherein said electronic switching means includes a timer circuit responsive to said output signal persisting for said second predetermined time to cause said output signal to have a predetermined duration.

18. In a transmitter including a power supply and a modulator for modulating information onto a carrier wave, a system for transmitting priority and secondary messages, said system comprising first input means for the priority voice message and coupled to the modulator, a switch coupled to the power supply and adapted to be actuated to energize the power supply when it is desired to transmit a priority message, second input means for the secondary message, a memory circuit coupled to said second input means for storing a secondary message therefrom, circuit means coupled to said switch and to said memory circuit and responsive only to the concurrence of the non-actuation of said switch and the presence of the secondary message to provide a control signal and a maintainance signal, readout means having an output coupled to said memory circuit and an input coupled to said circuit means and being responsive to said control signal to cause said memory circuit to release the stored secondary message, an output circuit having an input coupled to said memory circuit for utilizing the secondary message therefrom and having an output coupled to the modulator, and means coupling said circuit means to the power supply for coupling said maintainance signal thereto to maintain the transmitter energized when information from said output circuit is being applied to the modulator.

19. The system set forth in claim 18, wherein said circuit means includes a relay having a winding and at least one pair of contacts respectively coupled to an operating voltage and to said readout means, said winding being coupled to said switch and to said memory circuit and responsive to the concurrence of nonactuation of said switch and the presence of the secondary message to energize said winding and cause closure respectively of said pair of contacts.

20. A system for transmitting priority and secondary messages comprising first input means for the priority message, second input means having a plurality of outputs for providing a selected one of a plurality of secondary messages, a memory circuit having a plurality of outputs and a plurality of inputs respectively coupled to the outputs of said second input means for storing the selected secondary message, an OR circuit coupled to said memory circuit and being responsive only to the application and subsequent termination of said selected secondary message to provide an output signal, circuit means coupled to said first input means and to said OR circuit and responsive to the concurrence of the absence of a priority message and the presence of said output signal to provide a control signal, readout means having an output coupled to said memory circuit and an input coupled to said circuit means and being responsive to said control signal to cause said memory circuit to release the stored secondary message, and an output circuit coupled to said first input means and to said memory circuit respectively for utilizing the priority messages and the secondary messages therefrom.

21. The system set forth in claim 20, wherein said output circuit includes an encoder with a plurality of tone-generating circuits therein, said tone-generating circuits being respectively coupled to the outputs of said memory circuit, the selected secondary message being applied to the associated tone generator to cause the same to generate the associated control tone.

22. A system for transmitting priority and secondary messages comprising first input means for the priority message, second input means having at least two sets of a plurality of outputs each for providing a selected pair of secondary messages, a pair of memory circuits each having a plurality of inputs respectively coupled to the outputs of said second input means for storing the selected pair of secondary messages, a pair of OR circuits respectively coupled to said memory circuits and being responsive to the application and subsequent termination of said selected pair of secondary messages respectively to provide first and second output signals, an AND circuit coupled to said OR circuit and responsive to the presence of said first and second output signals therefrom to provide a further output signal, circuit means coupled to said first input means and to said AND circuit and responsive only to the concurrence of the absence of a priority message and the presence of said further output signal to provide a control signal, readout means having an output coupled to said memory circuit and an input coupled to said circuit means and being responsive to said control signal to cause said memory circuit to release the stored secondary message, and an output circuit coupled to said first input means and to said memory circuit respectively for utilizing the priority messages and the secondary messages therefrom.

23. A communication system comprising first input means for priority message having a control tone therein, second input means for a secondary message having a control tone therein, a memory circuit coupled to said second input means for storing a secondary message therefrom, circuit means coupled to said first input means and to said memory circuit and responsive only to the concurrence of the absence of a priority message and the presence of a secondary message to provide a control signal, readout means having an output coupled to said memory circuit and an output coupled to said circuit means and being responsive to said control signal to cause said memory circuit to release the stored secondary message, a communication channel coupled to said first input means and to said memory circuit respectively for transmitting whichever of the priority message and the secondary messages is present, utilization means coupled by way of switch means to said communication channel for utilizing the message transmitted by said communication channel, a filter coupled to said communication channel and tuned to the frequency of the control tone in the message transmitted by said communication channel, and an electronic switch coupled to said filter and responsive to an output from said filter to furnish an enabling signal for operating said switch means.

24. The system set forth in claim 23, wherein said electronic switch includes a further output, and further comprising further utilization means for utilizing a message applied thereto, whereby if the message transmitted by said communication channel does not contain the control tone associated with said filter, said electronic switch will be in condition to cause said message to be translated to said further utilization means.

25. In a transmitter having a carrier wave generating circuit and a power supply therefor and a modulator, an automatic identification system comprising a microphone for converting a priority message applied thereto into first electrical signals, input means for converting a secondary message into second electrical signals, a memory circuit coupled to said input means for storing the second electrical signals, circuit means coupled to said microphone and to said memory circuit and responsive to the concurrence of the absence of a priority message and the presence of a secondary message to provide a control signal, the modulator being coupled to said microphone and to said memory circuit for modulating the carrier wave in accordance with the first or second electrical signals, and switching means coupled to the power supply and having a first condition to couple a voltage thereto for energization thereof and having a second condition to isolate the voltage from the power supply, said switching means being operated into the first condition thereof when it is desired to speak into said microphone, said power supply being coupled to said circuit means and responsive to the control signal to remain energized despite said switching means being in its second condition, whereby placement of said switching means in its first condition causes transmission of the carrier wave and enables modulation of the carrier wave with the first electrical signals and the placement of said switching means in said second condition when a secondary message is stored in said memory circuit automatically continues transmission of the carrier wave and modulates it with the second electrical signals.

* * * * *

UNITED STATES PATENT OFFICE
CERTIFICATE OF CORRECTION

Patent No. 3,823,375 Dated July 9, 1974

Inventor(s) Keith H. Wycoff

It is certified that error appears in the above-identified patent and that said Letters Patent are hereby corrected as shown below:

Col. 6, line 38, "to" should be -- on --; line 66, "all of" should be deleted.
Col. 7, line 1, insert -- all of -- before "the"; line 3, "not" should be -- no --; line 13, "block" should be -- blocks --.
Col. 9, line 40, -- the -- should be inserted after "of".
Col. 12, lines 65 and 66, "element" should be -- elements --.
Col. 13, line 12, "dudio" should be -- audio --; line 51, -- a -- should be inserted after "actuating".
Col. 14, line 52, "tauted" should be -- tuated --; line 56, "second," second occurrence, should be -- secondary --.
Col. 17, line 40, "output" should be -- input --.

Col. 6, line 66, delete "all".

Signed and sealed this 3rd day of December 1974.

(SEAL)
Attest:

McCOY M. GIBSON JR.
Attesting Officer

C. MARSHALL DANN
Commissioner of Patents